March 3, 1970 D. S. THOMAS ET AL 3,498,556
WEB TRANSPORT APPARATUS
Filed March 28, 1967 2 Sheets-Sheet 2
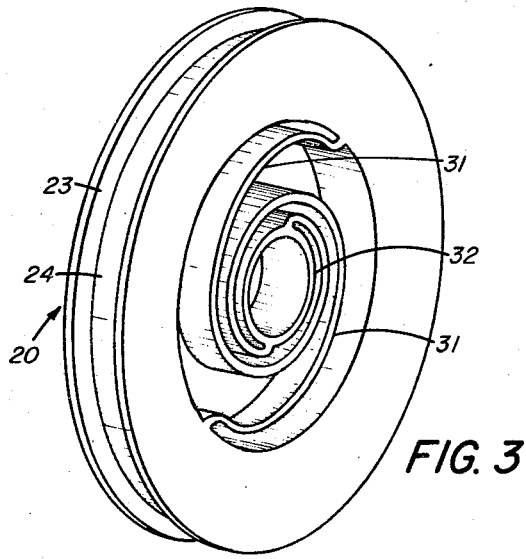
FIG. 3
FIG. 4A
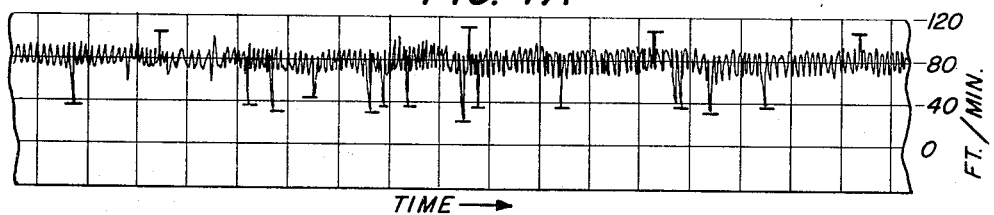
TIME →
FIG. 4B
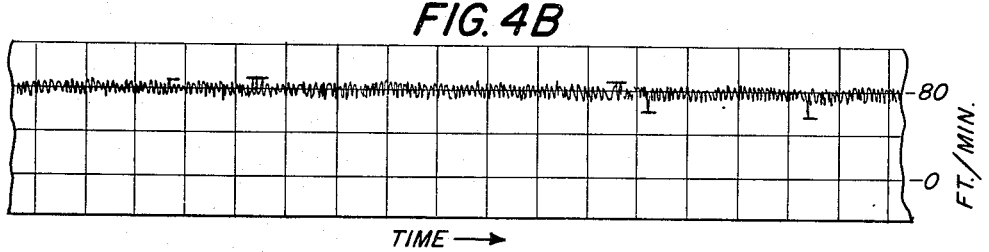
TIME →
GARY C. GRAHAM
DEANE S. THOMAS
INVENTORS
BY
ATTORNEYS

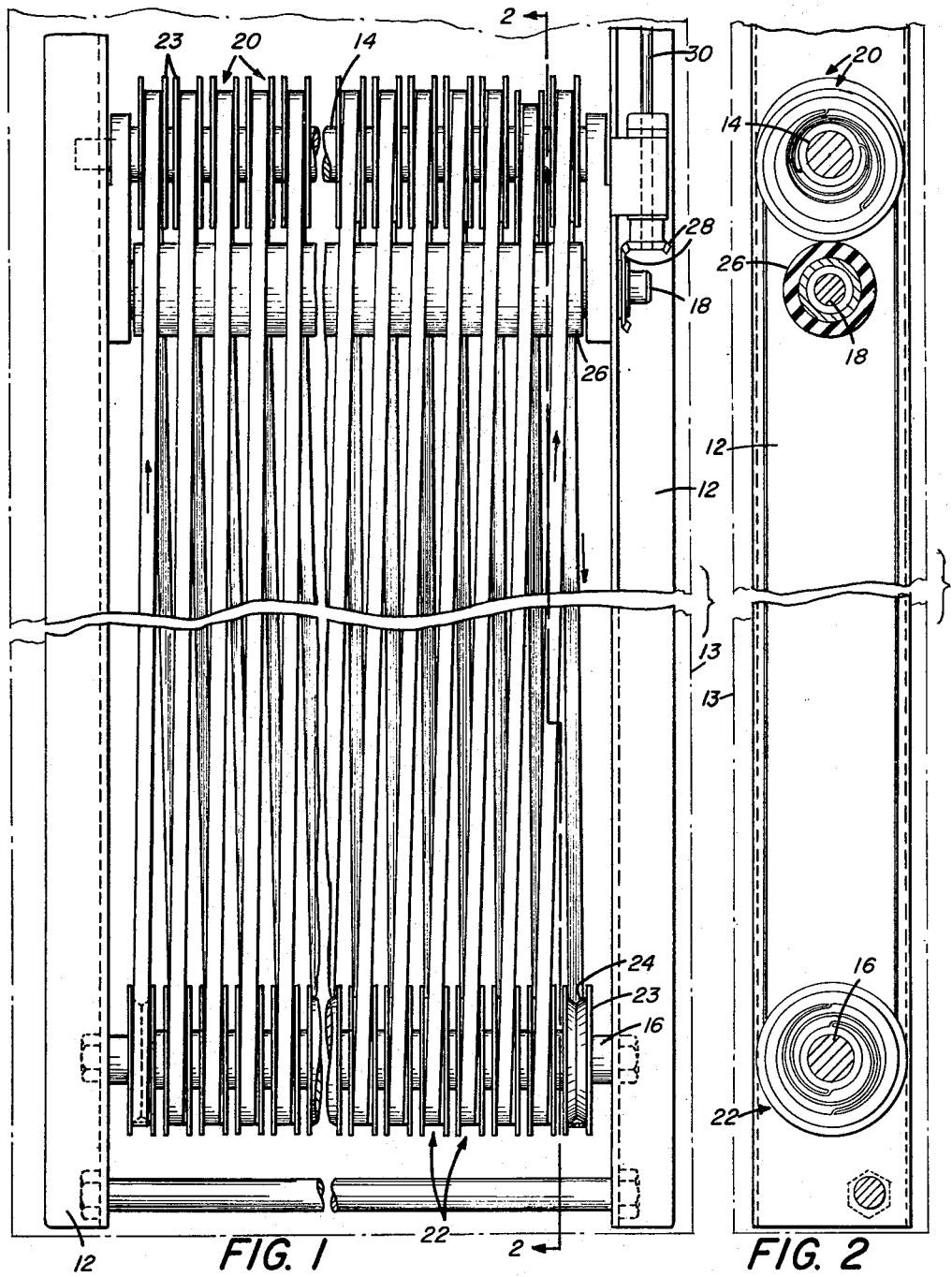

United States Patent Office 3,498,556
Patented Mar. 3, 1970

3,498,556
WEB TRANSPORT APPARATUS
Deane S. Thomas and Gary C. Graham, Rochester, N.Y., assignors to Eastman Kodak Company, Rochester, N.Y., a corporation of New Jersey
Filed Mar. 28, 1967, Ser. No. 626,511
Int. Cl. G11b 15/32
U.S. Cl. 242—55.01            4 Claims

ABSTRACT OF THE DISCLOSURE

A web transport using a "spring-core" spool as an idler to prevent web hesitation in a demand-drive transport system. A series of spaced apart film support spools is provided at the upper and lower regions of a film processing tank so as to form a multiplicity of loops as the film is transported through the processing tank. The spools are formed with a resiliently yielding spring-core in order to assure advancement of the film in response to demand of the film driving arrangement.

BACKGROUND OF THE INVENTION

In film processing it is the usual practice to run the film in a continuous length through a series of tanks containing processing solutions, rinsing solutions, fixing solutions and wash solutions and to then run it through one or more drying cabinets or chambers. A series of film support spools is provided at the top and the bottom of the tanks and the drying cabinets so that the film forms a multiplicity of loops in passing through each tank and through the drying cabinet. The film may be driven by sprocket wheels located at suitably spaced distances, by driven pacer rolls which pull the film through the processor or through a section of the processor, or by the frictional engagement of the support spools, some of which may be driven, or by a combination of any of these means.

As is well known in the art, the film, as it becomes wet in processing, swells and stretches and subsequently, as it is dried, shrinks to approximately its original size. In order to assure that the film is kept under proper tension, especially in friction drive processors, the support spools must accommodate the variations in film size, and the resulting changes in film tension, as it passes through the tanks. Thus, a tension regulating means must accommodate the stretching and shrinking of the film and generally include means for enlarging and reducing the size of the film loops or some of the film loops which the film forms as it is wound about the various support spools.

As the length of film passing through the processor is significantly increased, as is often desirable in present high capacity processing machines, the friction developed by the support spools may become too great to be overcome by driving only selected spools or by using a pacer roll at the end of each section. Furthermore, as the size of the film being processed is reduced, while the speed of processing is at the same time increased, the film tension must be maintained within closer limits than has heretofore been necessary. Otherwise, the film may not be driven or it may be stretched so tightly as to break, resulting in costly product waste, machine shutdown and processing delays.

Accordingly, it has been found necessary to utilize a "demand-drive" film or web transport apparatus in such high capacity processing machines. Two examples of such "demand-drive" web transport apparatus may be found in copending applications Ser. No. 555,361 and 555,362, both filed on June 6, 1966, now Patent Nos. 3,369,765 and 3,380,678, respectively. These applications are directed to a web transport device for use in a continuous film processor wherein the film support spools are arranged to be self-supporting and yet capable of a limited amount of deflection under the influence of increased film tension whereby the spools may be moved into contact with driving rolls, which operate to increase the speed of the support spools thus accommodating and tending to reduce the increased film tension.

It has, however, been found that under certain high-speed operating conditions such "demand-drive" web transport apparatus is subject to the disadvantage that small disturbances in the web motion are transmitted from the exit end of the apparatus to the inlet end while, at the same time, being amplified as they travel back through the machine until they become major hesitations. These hesitations can be severe enough to interfere with optimum processing efficiency. They may generate enough force to break the web, create web loops large enough to jump the spools, or cause the web to stop long enough to actuate a break detector and thus stop the entire apparatus. While such stopping of the apparatus may be undesirable because of the interruption in production, it is even more harmful when it occurs in a process in which the product stopped in certain phases of the process may be ruined. Moreover, such problems are increased as the size of the web decreases and as the length and speed of the apparatus increase.

SUMMARY OF THE INVENTION

Accordingly, the present invention provides a demand-drive web transport apparatus comprising a plurality of support spools arranged to be moved into driving position by increased tension of the web. A plurality of idler support spools are disposed on a shaft in the apparatus. The improvement comprises at least some of the idler support spools having a substantially rigid central hub portion arranged to rotate on the shaft and a substantially rigid constant diameter rim portion for engagement of the web is disposed about and has a larger diameter than the hub. At least one flexible member connects the rim portion to the hub portion so that the rim portion may rotate about the hub at varying radial distances to damp out variations in web speed.

Moreover, the present invention provides a demand-drive web transport apparatus including a first shaft and a substantially parallel second shaft spaced therefrom, each of which support a plurality of web support spools arranged for free rotation thereabout, wherein the web forms a multiplicity of loops around the two sets of support spools. A third shaft, which is driven, may be disposed in closely spaced relationship with one of the support spool shafts. The drive shaft is arranged so that it is not normally in periphera contact with the support spools on the adjacent shaft. The improvement of the present invention comprises one or more of the support spools on the shaft remote from the drive shaft being arranged with a substantially centrally disposed hub portion arranged for rotation on the respective shaft. A rigid constant diameter rim portion for engagement of the web is disposed about and has a diameter larger than the hub. At least one flexible member connects the rim portion to the hub portion so that varying web tension causes the rim to deflect to damp out variations in web speed.

The various features of novelty which characterize the present invention are pointed out with particularity in the claims annexed to and forming a part of this specification. For a better understanding of the invention, its operating advantages and the specific objects obtained by its use, reference should be had to the accompanying drawings and descriptive matter in which the preferred embodiment of the present invention is illustrated and described.

BRIEF DESCRIPTION OF THE DRAWINGS

FIG. 1 is a partial elevation of a film processing machine incorporating a specific embodiment of the present invention;

FIG. 2 is a section of the film processor of the present invention taken along line 2—2 of FIG. 1;

FIG. 3 is an enlarged view of the idler spool of the present invention; and

FIG. 4A is a graphic representation of web speed variations without the idler spools of the present invention.

FIG. 4B is a graphic representation of web speed variations using the idler spools of the present invention.

DESCRIPTION OF THE PREFERRED EMBODIMENT

A section of a processing machine incorporating an embodiment of the present invention is illustrated in FIG. 1 wherein a pair of support channels 12, which extend the height of the processing machine, are provided with substantially parallel upper and lower shafts 14 and 16 extending therebetween. Each section is normally disposed in a tank containing a processing solution, which tank is shown here in phantom at 13. While only one section is illustrated, several similar sectons may be incorporated in a processing machine.

A third shaft 18 is disposed immediately below upper shaft 14 and is rotatably supported at each end in channels 12. Each of shafts 14 and 16 are provided with a plurality of web support spools 20 and 22, respectively, rotatably mounted thereon. Each of the spools is preferably flanged, as at 23, and is provided with a film support rim 24 which may be undercut, as is well known in the art, to avoid damaging the surface of the film. The general size and shape of the upper and lower spools are similar so that the film may be threaded thereover in a manner well known in the art. The shaft 18 may have a friction drive roller 26 mounted thereon, and is driven by a source of power (not shown) through bevel gears 28 and shaft 30. The drive shaft 18 is disposed parallel to the upper shaft 14 at a distance just greater than the sum of the radii of an upper spool 20 and the drive roller 26 so that the upper spools are ordinarily free to rotate on shaft 14 independently of the drive roller.

Each of the upper spools may be formed as illustrated in FIGS. 2 and 3 and has a generally cylindrical, substantially rigid central hub portion 32 arranged to rotate freely on shaft 14 coaxial with the axis thereof. As described in copending application Ser. No. 555,362 now Patent No. 3,380,678, the substantially rigid, constant diameter rim portion 24 is disposed about and has a larger diameter than the hub. The rim is integrally connected to the hub by at least one, and as illustrated, two flexible spiral members 31 which permit the rim portion to be deflected radially with respect to the axis of the hub portion. Thus, the rim portion may rotate about the hub axis at varying radial distances. As illustrated, the flexible members 31 may be involute in shape permitting the spool to absorb a certain amount of angular displacement without stressing the film. The entire spool illustrated may be of a unitary construction and may be molded of polyethylene or other suitable material which can provide the flexibility desired in spiral members 31. Thus, when increased film tension causes the rim portion 24 to deflect, the outer edge of the rim will be moved into contact with the drive roller 26, which may have a high friction outer surface, which will drive the spool so deflected.

As the film is drawn through the processor, it is looped continuously between upper spools 20 and lower spools 22 and is usually pulled by a separate feed spool or pacer roll (not shown) at the outlet of the section. Normally, as the film is drawn through a particular section, the only driving force is supplied by the feed spool with the spools 20 and 22 being free to rotate on their respective shafts. However, as tension of the film increases, either due to friction developed by the spools or because of the stretching or tightening of the film due to the processing, one or more of the flexible upper spools 20 is deflected into contact with the driving roller 26 which operates at a speed slightly greater than that of the feed spool. The speed of the film passing over the deflected spool is thereby increased, tending to relieve the tension in the film beyond that point. At the same time, the tension in the film preceding the driven spool may be increased sufficiently to deflect the preceding spool into contact with the driving roller 26, repeating the process.

It has been found, however, in such processing machines as described above, that small disturbances generated in the web transport apparatus have been amplified to an extent that makes continued operation difficult or impossible. In a test of a processing machine wherein 8 mm. film was processed at 80 feet per minute, a high incidence of "hesitation" was noted. The hesitations were observed to originate near the outlet of the machine and were generally small at that location. The hesitations appeared to be transmitted through the machine toward the inlet end, opposite the direction of web travel, and were amplified as they moved toward the inlet end.

It has been found that the utilization of flexible spools, similar to drive spools 20, as idler spools 22 results in a dramatic elimination of web hesitations. Subsequent to the foregoing test the same processing machine, having 21 sections, was modified with flexible spools being substituted for the rigid idler spools in the initial 10 sections. FIG. 4A illustrates a record of the web speed taken as the web traveled between the 10th and 11th sections of the processor, i.e. the last section with the flexible idler spools and the first utilizing solid idler spools. The nominal speed of the web was 80 feet per minute. It is apparent that the web speed fluctuates greatly, at times dropping to as low as 24 feet per minute and sometimes increasing to as high as 112 feet per minute. These fluctuations were observed to be increasing in amplitude as they traveled toward the inlet end of the processor. Such fluctuations in web speed are sufficient to damage the web or to activate a web breakage detector.

Now referring to FIG. 4B, the record of the web speed, taken between the 8th and 9th sections of the processing machine during the same run and after the fluctuations had traveled through only two sections provided with flexible idler spools, shows that the variations of the web speed have been substantially eliminated. Thus, it will be seen that the use of flexible idler spools as taught by the present invention dramatically reduces the incidence of web hesitation along with the attendant difficulties.

It will be understood that, while only a portion of the processing machine was provided with flexible idler spools for the purposes of the foregoing test, normally the entire machine would be equipped with flexible idler spools.

Furthermore, while the present arrangement has been illustrated in a photographic processor in which the bottom spools only are idlers it will be appreciated that a processor embodying the present invention could be constructed where some of both the bottom and top spools are idlers.

It will be noted that the mass of the spool to be deflected is so small that little or no film stretching is encountered. As a result of the ability to control the film tension within such close limits it is possible to substantially increase the speed of the film passing through the processor without increasing the forces applied to the film. Furthermore, it will be seen that a local variation in the film tension can be readily accommodated without imposing undesirable loads upon the remainder of the film in the system. Moreover, the total film tension in the processor system disclosed is much less than that in prior art systems due to the fact that friction producing arrangements are eliminated.

Furthermore, the radius of the bends in the film is not changed as the spools are deflected since the rim is substantially rigid and has a constant diameter. As a result, the film is not subjected to smaller radius turns which could possibly result in film breakage.

While particular reference has been made to the use of the present invention in film processors, it will be appreciated that it may be advantageously applied to many other web transport systems.

The invention has been described in detail with particular reference to preferred embodiments thereof, but it will be understood that variations and modifications can be effected within the spirit and scope of the invention as described hereinabove and as defined in the appended claims.

We claim:

1. A demand-drive web transport apparatus comprising a plurality of rotatably mounted web driving spools and non-driven web idler spools arranged in spaced relationship for supporting a moving web whereby the web forms multiplicity of loops as it moves about said spool, means arranged in driving relation to drive said driven spools, said web driving spools arranged to be moved into a web driving position by increased tension of the web, the improvement comprising at least one of said non-driven web idler spools having a substantially rigid central hub portion arranged to rotate about a given axis, a substantially rigid constant diameter rim portion for engaging the web, said rim portion being disposed about and having a larger diameter than said hub portion, and at least one flexible member connecting said rim portion to said hub portion whereby said rim portion may rotate about said axis at varying radial distances.

2. The invention according to claim 1 wherein the flexible member is a generally helical spring member integrally formed with said hub portion and said rim portion.

3. The invention according to claim 1 wherein the flexible member is an involute shaped spring.

4. A demand-drive web transport apparatus comprising a first shaft and a substantially parallel second shaft spaced therefrom, a plurality of driven and non-driven web support spools rotatably mounted on said shafts for supporting a web which forms a multiplicity of loops as it moves about said support spools, a drive shaft disposed adjacent said first shaft, said drive shaft arranged so that the support spools on said first shaft are moved into driving contact therewith by increased web tension, the improvement comprising at least one of the non-driven spools on said second shaft having a substantially rigid central hub portion arranged to rotate on said second shaft, a substantially rigid constant diameter rim portion for engaging the web, said rim portion being disposed about and having a larger diameter than said hub portion, and at least one flexible member connecting said rim portion to said hub portion so that varying web tension causes the rim to deflect thereby damping out variations in web speed.

References Cited

UNITED STATES PATENTS

| | | | |
|---|---|---|---|
| 1,749,393 | 3/1930 | Pflimlin | 29—128 X |
| 1,789,847 | 1/1931 | Smith | 29—126 |
| 1,933,127 | 10/1933 | Thompson | 242—55.01 |
| 3,380,678 | 4/1968 | Feasey et al. | 242—55.01 |

LEONARD D. CHRISTIAN, Primary Examiner

U.S. Cl. X.R.

226—118